(12) United States Patent
Harding et al.

(10) Patent No.: US 10,773,488 B2
(45) Date of Patent: Sep. 15, 2020

(54) POLYETHYLENE SHEET AND ARTICLES MADE THEREFROM

(71) Applicant: DUPONT SAFETY & CONSTRUCTION, INC., Wilmington, DE (US)

(72) Inventors: Kenneth C Harding, Boone, NC (US); James Neal Singletary, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 117 days.

(21) Appl. No.: 15/825,496

(22) Filed: Nov. 29, 2017

(65) Prior Publication Data

US 2019/0160782 A1  May 30, 2019

(51) Int. Cl.
*B32B 5/02* (2006.01)
*B32B 7/00* (2019.01)
(Continued)

(52) U.S. Cl.
CPC .................. *B32B 7/03* (2019.01); *B32B 5/02* (2013.01); *B32B 5/022* (2013.01); *B32B 5/12* (2013.01); *B32B 7/00* (2013.01); *B32B 7/02* (2013.01); *B32B 7/04* (2013.01); *B32B 7/12* (2013.01); *B32B 27/06* (2013.01); *B32B 27/08* (2013.01); *B32B 27/12* (2013.01); *B32B 27/18* (2013.01); *B32B 27/20* (2013.01); *B32B 27/32* (2013.01);
(Continued)

(58) Field of Classification Search
CPC .. B32B 7/03; B32B 5/022; B32B 7/12; B32B 27/08; B32B 27/12; B32B 27/32; B32B 2307/516; B32B 2307/72; B32B 2323/04; B32B 2323/043
See application file for complete search history.

(56) References Cited

U.S. PATENT DOCUMENTS 7,858,004 B2  12/2010  Harding et al.
7,923,094 B1   4/2011  Harding et al.
(Continued)

FOREIGN PATENT DOCUMENTS

WO  2013/068351 A1   5/2013
WO  2017/184186 A1  10/2017

OTHER PUBLICATIONS

Prifti, Joseph J., et al., "Hardened Tuned-Wall Plastic Radomes for Military Radars". US Army Materials and Mechanics Research Center Report, Accession No. ADA026146, Watertown, Massachusetts 1976.
(Continued)

*Primary Examiner* — Joanna Pleszczynska

(57) ABSTRACT

A non-fibrous oriented polyethylene monolayer comprising ultra high molecular weight polyethylene, the polyethylene having a viscosity-average molecular weight of 2,000,000 or greater, wherein (i) the monolayer has a width of 10.0 mm or greater and a modulus of at least 100 N/tex, (ii) the monolayer has a tan δ when measured in dynamic mechanical analysis (DMA) of tensile response in a frequency sweep between 0.1 Hz≤f≤1.0 Hz meeting the inequality of tan δ<1/(f×a)+b−(f×c) where a=120, b=0.045 and c=0.016, and (iii) the monolayer has a maximum areal weight of no greater than 45 gsm.

20 Claims, 5 Drawing Sheets

(51) Int. Cl.
  *B32B 7/12* (2006.01)
  *B32B 27/12* (2006.01)
  *B32B 27/32* (2006.01)
  *B32B 7/03* (2019.01)
  *B32B 27/08* (2006.01)
  *B32B 37/12* (2006.01)
  *F41H 5/04* (2006.01)
  *G01N 3/30* (2006.01)
  *B32B 27/20* (2006.01)
  *B32B 27/18* (2006.01)
  *B32B 5/12* (2006.01)
  *B32B 7/02* (2019.01)
  *B32B 37/06* (2006.01)
  *B32B 27/06* (2006.01)
  *B32B 37/10* (2006.01)
  *B32B 7/04* (2019.01)
  *G01N 3/40* (2006.01)

(52) U.S. Cl.
  CPC ............ *B32B 27/327* (2013.01); *B32B 37/06* (2013.01); *B32B 37/10* (2013.01); *B32B 37/12* (2013.01); *F41H 5/0478* (2013.01); *G01N 3/30* (2013.01); *B32B 2250/00* (2013.01); *B32B 2250/40* (2013.01); *B32B 2250/42* (2013.01); *B32B 2260/021* (2013.01); *B32B 2260/046* (2013.01); *B32B 2262/0253* (2013.01); *B32B 2262/0261* (2013.01); *B32B 2264/00* (2013.01); *B32B 2264/02* (2013.01); *B32B 2264/10* (2013.01); *B32B 2307/51* (2013.01); *B32B 2307/514* (2013.01); *B32B 2307/516* (2013.01); *B32B 2307/54* (2013.01); *B32B 2307/542* (2013.01); *B32B 2307/558* (2013.01); *B32B 2307/581* (2013.01); *B32B 2307/718* (2013.01); *B32B 2307/72* (2013.01); *B32B 2307/732* (2013.01); *B32B 2307/734* (2013.01); *B32B 2571/00* (2013.01); *B32B 2571/02* (2013.01); *G01N 3/40* (2013.01)

(56) References Cited

U.S. PATENT DOCUMENTS

| | | | |
|---|---|---|---|
| 7,972,679 | B1 | 7/2011 | Lyons et al. |
| 8,197,935 | B2 | 6/2012 | Bovenschen et al. |
| 8,206,810 | B1 | 6/2012 | Harding et al. |
| 2006/0251847 | A1* | 11/2006 | Hethcock ................ B29C 53/40 428/58 |
| 2016/0236450 | A1 | 8/2016 | Singletary |
| 2017/0138703 | A1* | 5/2017 | Wadley ................ F41H 5/0485 |

OTHER PUBLICATIONS

International Search Report, dated Oct. 30, 2018, for corresponding International Application No. PCT/US2018/051715, filed on Sep. 19, 2018.

* cited by examiner

POLYETHYLENE SHEET AND ARTICLES MADE THEREFROM

BACKGROUND

1. Field of the Invention

This invention pertains to a polyethylene sheet suitable for use in an impact penetration resistant laminate.

2. Description of Related Art

U.S. Pat. No. 8,206,810 to Harding et al. describes a non-fibrous, high tenacity, highly oriented UHMWPE tape or sheet of high molecular weight having a substantially large aspect ratio, a high tenacity, and a substantially higher tensile modulus. The UHMWPE tape includes an average molecular weight of 2,000,000 or greater, a width of ½-inch or greater, a thickness of between 0.0008 and 0.004 inch, and a modulus of between 1600 and 2500 grams per denier.

U.S. Pat. No. 7,858,004 to Harding and Weedon teaches a process for the production of virtually full density polyolefin suitable for further processing by drawing to form a high tenacity, highly oriented polyolefin sheet comprising: a) feeding a metered amount of polyolefin powder into the nip between two heated calender rolls; b) rolling the powder through the nip under these conditions until a coherent sheet of polyolefin is produced. According to a highly preferred embodiment, initially, the nip is set at a gap smaller than the size of the smallest polyolefin powder particle and at a temperature above the melting point of the powder and once a coherent sheet of polyolefin exits the nip the temperature in the nip is lowered to a temperature below the melting point of the polyolefin powder and the gap increased to a desired level above the thickness of the largest powder particle.

PCT publication WO 2013/068351 to De Weijer et al. discloses a ballistic-resistant molded article comprising a compressed stack of sheets comprising high molecular weight polyethylene tapes, the direction of the polyethylene tapes within the compressed stack being not unidirectionally, wherein at least part of the tapes have a width of at least 2 mm and a thickness to width ratio of at least 10:1 and a density of at most 99% of the theoretical tape density. The molded article is based on tapes which have a density below the theoretical density of the tapes. The use of low-density tapes is believed to contribute to the ballistic performance of the panel.

U.S. Pat. No. 8,197,935 to Bovenschen at al. discloses a ballistic-resistant moulded article having a compressed stack of sheets including reinforcing elongate bodies, where at least some of the elongate bodies are polyethylene elongate bodies that have a weight average molecular weight of at least 100,000 gram/mole and a Mw/Mn ratio of at most 6.

SUMMARY OF THE INVENTION

This invention pertains to a non-fibrous oriented polyethylene monolayer comprising ultra high molecular weight polyethylene (UHMWPE), the polyethylene having a viscosity-average molecular weight of 2,000,000 or greater, wherein
  (i) the monolayer has a width of 10.0 mm or greater and a modulus of at least 100 N/tex,
  (ii) the monolayer has a tan δ when measured in dynamic mechanical analysis (DMA) of tensile response in a frequency sweep between 0.1 Hz≤f≤1.0 Hz meeting the inequality of tan δ<1/(f×a)+b−(f×c) where a=120, b=0.045 and c=0.016.

(iii) the monolayer has a maximum areal weight of no greater than 45 gsm.

The invention further pertains to a cross-plied tape comprising a plurality of monolayers of claim 1 wherein each monolayer is arranged such that the direction of maximum orientation in one monolayer is orthogonal with respect to the direction of maximum orientation in the next monolayer.

DETAILED DESCRIPTION

Figure 1:
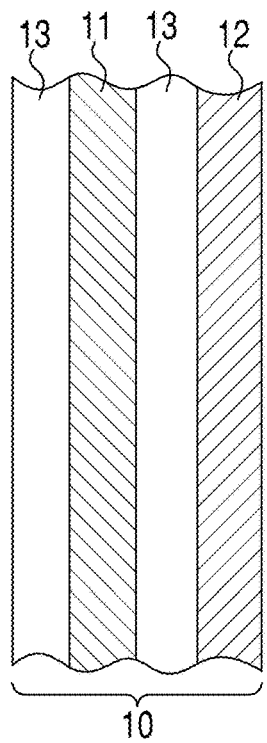
FIG. 1 shows a cross section through a cross-plied non-fibrous ultra-high molecular weight (UHMWPE) polyethylene tape.

The date and/or issue of specifications referenced in this section are as follows:
ASTM D7744-11 was published in September 2011.
ASTM D4440-07 was published in March 2007.
MIL-DTL-662F was published in 1997.
MIL-DTL-46593B was published in 2006.
NIJ-0115.00 was published in 2000.

Polyethylene Monolayer

Each monolayer or film, the terms being used interchangeably, is non-filamentary and is highly oriented. By highly oriented is meant that the modulus in one direction, normally the direction in which the oriented film monolayer is produced, is at least 10 times greater than in any other direction. Preferably, the modulus in one direction is at least 20 times greater and more preferably at least 30 times greater than in any other direction.

The term "monolayer" as used herein refers to ultra-high molecular weight polyethylene (UHMWPE) film products having widths on the order of at least 10 mm or 12.5 mm or greater, preferably greater than 20 mm, more preferably greater than 30 mm or more preferably greater than 40 mm or even greater than 100 mm of a generally rectangular cross-section and having smooth edges and is specifically used to distinguish from the "fibrous" UHMWPE products that are on the order of 3 mm wide or narrower. Representative UHMWPE films of the present invention have a width of at least about 25 mm, a thickness of between 0.02 mm and 0.102 mm when measured, using calipers, at minimal pressure, preferably between 0.02 and 0.06 mm, more preferably between 0.027 and 0.058 mm, and a first modulus, defined as "M1" in ASTM D7744, of at least about 100 N/Tex, preferably at least about 115 or 120 N/Tex, more preferably at least about 140 N/Tex, and most preferably at least about 160 N/Tex. In some embodiments, the film has a very high width to thickness ratio, unlike fibrous UHMWPE, which has a width that is substantially similar to the thickness. A UHMWPE film according to the present invention, for example, may include a width of 25.4 mm and a thickness of 0.0635 mm, which indicates a width to thickness ratio of 400:1. The monolayer may be produced at a linear density of from about 660 Tex to about 1100 Tex and higher. There is no theoretical limit to the width of the high modulus polyethylene film, and it is limited only by the size of the processing equipment.

The term "UHMWPE" or "UHMWPE powder" as used herein refers to the polymer used in the process of making the monolayer of this invention. The UHMWPE powder preferably has a crystallinity of at least 75% as determined by differential scanning calorimeter (DSC) and more preferably at least 76%. The polymer also has a specific heat of fusion of greater than 220 joules/gram also determined by DSC. The molecular weight of the polymer is at least 2,000,000 and more preferably greater than 4,000,000. In some embodiments the molecular weight is between 2-8 million or even 3-7 million. The polymer is preferably not exposed to more than 1 degree C. above the onset of melt determined by DSC and preferably is maintained below the onset of melt during formation of the rolled sheet. Preferably, the crystalline structures have low entanglement. Low entanglement allows the polymer particles to elongate during rolling and drawing to the high total draws required to obtain the high modulus of this invention. Such commercially available polymers as GUR-168 from Ticona Engineering Polymers and Mitsui 540RU and 730MU from Mitsui Chemicals can be used to obtain the very high modulus tape of this invention. Both these polymers have an onset of melt between 135.5 to 137.degree. C. Low entanglement as used herein refers to the ability of the polymer crystalline structure as used in the UHMWPE tape of the present invention, to easily stretch to high draw ratios while being pulled or stretched. Polymers with highly entangled crystalline structures do not have the ability to be stretched easily without damage and resulting loss of properties and polymers with a high amorphous content (lack of high crystallinity) cannot develop the required properties. Many classes of UHMWPE polymers are highly amorphous and have low crystallinity. The percentage crystallinity can be determined using a differential scanning calorimeter (DSC).

Production of a high modulus UHMWPE monolayer according to the present invention can be performed in two parts, as described herein, or in a single process. Preferably, in order to provide a high and efficient throughput, the invention includes a direct roll process coupled with a subsequent drawing process. In the descriptions herein, the term "total draw" or "total draw ratio" refers to the total amount of elongation of the original polymer particles. Elongation occurs in two steps, rolling and drawing and total draw is equal to the elongation in rolling times the elongation during drawing. Draw may be accomplished in multiple steps, in which case total draw is the product of rolling draw and each individual draw step. The first draw or rolling step, involves elongation of the polymer particles to form a rolled sheet. The elongation or draw amount during rolling is the length of a polymer particle after rolling divided by the particle size prior to rolling. A sheet or web with particles that have been elongated by 2 times is considered as being drawn 2 times. In order to produce a substantially strong finished monolayer suitable for high modulus applications the rolled sheet draw amount is 4 to 12 times and the most preferred draw amount in rolling is 5 to 11 times or even 7 to 11 times. Thus, this implies that most preferably the UHMWPE particles are elongated or lengthened 5 to 11 times their original length during rolling. A rolled sheet with elongations of 11 will exhibit a much higher degree of orientation compared to a sheet with an elongation of 2. As an example, for a sheet rolled to an elongation of 6 and further drawn 20 times in the drawing step, the total draw is 6*20 or 120, while an elongation of the initial rolled sheet of 10 that is drawn 20 times will have a total draw of 200. Typical post draw ranges for the oriented tape are 18 to 25 when the rolling draw is 5 to 9. While it is possible to obtain suitable properties for some applications, for production of the high modulus UHMWPE film according to the current invention, the total draw, also known as total draw ratio, is preferably above 100 and may be as high as 160 or 180 or 200 or higher depending on the polymer molecular weight, crystallinity, and degree of entanglement of the crystal structures. Orientation and modulus of the UHMWPE tape increases as the total draw or draw ratio increases. The term "highly oriented" tape as used herein refers to polyolefin tape drawn to a total draw ratio of 100 or greater, which implies that the polymer particles within the tape have been stretched in a single direction 100 times their original size. During drawing of UHMWPE according to the present invention, several properties including length, material orientation, physical tensile properties such as strength and modulus, heat of fusion, and melt temperature will typically increase. Elongation, thickness and width will typically decrease. In some embodiments, the roll drawing is carried out at a temperature in the range of 130-136.5° C. or from 130-136° C. A preferred range is from 134-136° C.

Preferably, the lineal pressure exerted by the calender roll set on the heated polymer will be over 4000-N/cm. More preferably, over 4400-N/cm. Yet more preferably, over 5000-N/cm. No maximum calender pressure has been identified above which manufacture of the invention becomes fundamentally impractical or the end use value of the invented film decreases. However, one skilled in the art will appreciate that increasing calender roll pressures challenge the ability of a given set of rolls and their frame to accept a continuous flow of powder sufficient to sustain web continuity, and also to create a flat film, that is to say a film without buckles. To create flat film, preferably, the maximum ratio of thicknesses across the width of the film between the center and within 1 cm of the edge should be less than 1.5. More preferably, the ratio should be less than 1.3. Yet more preferably, the ratio should be less than 1.2.

Preferably, after rolling, the film will be stretched further over multiple steps. More preferably, the film will be stretched in three or more steps. These stretching steps may be coupled or decoupled relative to each other and to the initial rolling step. The steps may be comprised of one or multiple techniques known in the art, such as pulling across a heated surface to allow conductive heat transfer or stretching in a convection oven. Radiative heating is possible but is generally not preferred because of the low absorbance of the films to infrared radiation.

Preferably, in each stretching step after rolling, the temperature of the film will be adjusted so that the film stretches at a tension of between 0.35 and 0.71-N/Tex. More preferably, the temperature in each stretching step after rolling will be adjusted so that the film stretches at a tension of between 0.39 and 0.62-N/Tex. Most preferably, the temperature in each stretching step after rolling will be adjusted so that the film stretches at a tension of between 0.40 and 0.53-N/Tex.

Preferably, the UHMWPE powder also has a specific heat of fusion of greater than 220 joules/gram as determined by differential scanning calorimetry, using a constant temperature ramp of 10 degrees C. per minute.

The monolayer has a tan δ when measured in dynamic mechanical analysis (DMA) of tensile response in a sweep of frequency, f, between 0.1 Hz≤f≤1.0 Hz at around 22 degrees C. meeting the inequality $$\tan \delta < 1/(a \times f) + b - c \times f$$

where f is in Hz, x is the symbol for multiplication and a=120, b=0.045 and c=0.016. Preferably, a=135 and b=0.044. More preferably, a=150 and b=0.043. Most preferably, a=170 and b=0.042.

Preferably, the monolayer has a maximum areal weight of no greater than 45 g/m², a thickness of from 25 μm to 75 μm and a density of between 600 and 750 kg/m³. In other embodiments, the maximum areal weight of the monolayer may be no greater than 40 g/m² or 35 g/m² or 30 g/m² or 25 g/m² or 20 g/m². In yet other embodiments, the density of the monolayer is from 600 to 720 kg/m³ or 600 to 700 kg/m³ or 600 to 680 kg/m³.

The density of the monolayer will increase if it is compressed after manufacturing under sufficient pressure to permanently deform the original monolayer, and will ultimately approach the density of a polyethylene crystal if the monolayer is under sufficiently high pressure. Compression under elevated temperature will further increase monolayer density.

The specific energy absorption (SEA) of the monolayer, as measured by Test Method A, is at least 60-J-m²/kg or at least 63 J-m²/kg or at least 67 J-m²/kg or at least 69 J-m²/kg or at least 71 J-m²/kg.

Cross-Plied Tape

A cross-plied tape comprises a plurality of monolayers, preferably two or four and, optionally, an adhesive having a maximum areal weight of 5 gsm that is located between the monolayers. In some embodiments the weight of the adhesive layer is less than 4.5 gsm or even less than 4 gsm.

In other embodiments, the optional adhesive further comprises a textile layer which may be a scrim or nonwoven fabric.

An exemplary cross-plied tape is shown at 10 in FIG. 1 and comprises two monolayers of UHMWPE oriented film 11 and 12 and two layers of adhesive 13. The direction of orientation of one film monolayer 11 is offset with respect to the direction of orientation of the other film monolayer 12. Preferably the two oriented film monolayers layers 11 and 12 have an orientation that is essentially orthogonal to each other. By "essentially orthogonal" is meant that the two sheets are positioned relative to each other at an angle of 90+/−15 degrees. This is sometimes referred to as a 0/90 arrangement.

Two adhesive layers 13 are positioned a shown in FIG. 1. The cross-piled sheet 10 described above comprises two monolayers and two adhesive layers. This is a preferred construction, however a sheet may comprise more than two monolayers or more than two adhesive layers such as in a 0/90/0/90 arrangement.

Structures without any adhesive or only a few layers of adhesive are also envisaged.

Structures without any adhesive on their exteriors are also envisioned. Structures laminated to abrasion-resistant polymer films are also envisioned.

The cross-plied sheet as used herein is meant to refer to thin sections of material in widths greater than about 0.2 m and up to or exceeding 1.6 m width as could be produced in large commercial equipment specifically designed for production in such widths and having a rectangular cross-section and smooth edges.

Adhesive

The optional adhesive 13 in FIG. 1 is placed adjacent to the surface of each monolayer to bond adjacent monolayers together. Each adhesive layer has a basis weight of no greater than 5 gsm.

Suitable examples of adhesive are urethanes, polyethylene, polyamide, ethylene copolymers including ethylene-octene copolymers, ethylene vinylacetate copolymer, ethylene acrylic acid copolymer, polystryrene-isoprene copolymer, or ethylene/methacrylic acid copolymer, ionomers, metallocenes, and thermoplastic rubbers such as block copolymers of styrene and isoprene or styrene and butadiene. The adhesive may further comprise a thixotrope to reduce the propensity for adjacent sheets to slide relative to each other during a compression process. Suitable thixotropes include organic particles whose shape can be characterized as dendritic (representative of which is DuPont™ Kevlar® aramid fiber pulp), spherical, plate-like, or rod-like, or inorganic particles such as silica or aluminum trihydrate. The adhesive may further include other functional additives such as nanomaterials and flame retardants.

In some embodiments, the adhesive may be in the form of a film, paste or liquid and may further comprise a textile layer which may be a scrim or nonwoven fabric.

Consolidated Impact and Penetration-Resistant Laminate

Figure 2:
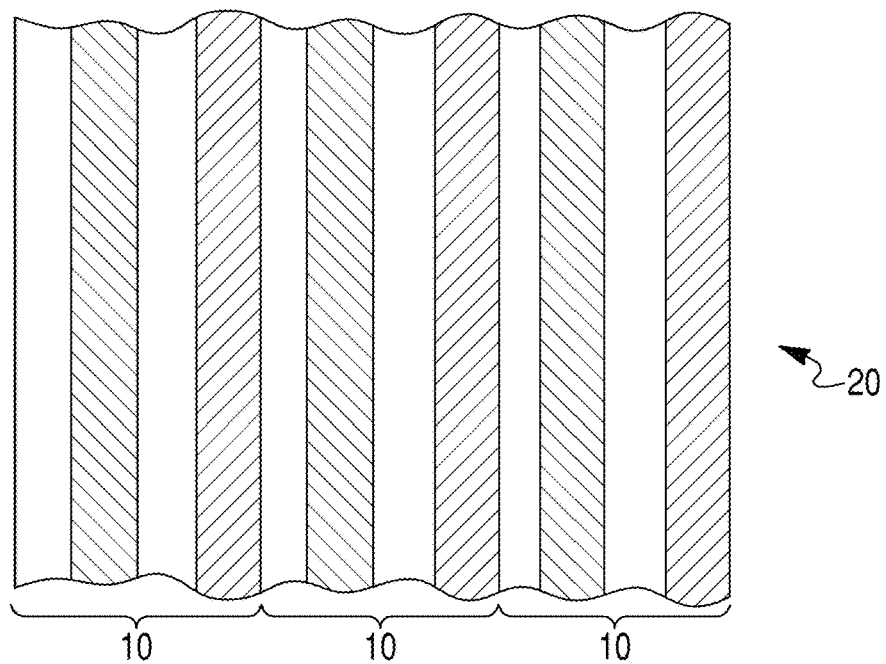
FIG. 2 shows a cross section through a laminate comprising a plurality of cross-plied tapes.

FIG. 2 shows an exemplary laminate comprising a plurality of cross-pied non-fibrous ultra-high molecular weight polyethylene tapes 10. In some embodiments, at least 90 percent, more preferably at least 95 percent or most preferably 100 percent of the tapes are positioned within the laminate such that the orientation of a monolayer of one tape is offset with respect to the orientation of the closest monolayer of the next tape.

The number of cross-plied tapes in a laminate will vary based on the design requirements of the finished article but typically is in the range of from 20 to 1000 giving a laminate weight range of from 0.1 to 600 kg/m² or from 1 to 60 kg/m² or even from 1 to 40 kg/m². The laminate is formed by compression of a stack of sheets at a temperature at which the adhesive will flow but is less than the temperature at which the monolayer of the tape loses orientation, and thus mechanical strength. Typically, the adhesive comprises no more than 15 weight percent of the combined weight of polyethylene tape plus adhesive in the laminate.

The laminate may further comprise at least one layer of continuous filament fibers embedded in a matrix resin. The fibers may be provided in the form of a woven fabric, a warp- or weft-insertion knitted fabric, a non-woven fabric or a unidirectional fabric, these terms being well known to those in the textile art. Preferably, the polymer of the continuous filament fibers is p-aramid or its copolymers, or UHMWPE or a combination of both. By p-aramid is meant polyaramid, such as poly(paraphenylene terephthalamide) or an aromatic copolyamide such as is prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers or a copolymer derived from the copolymerization of para-phenylenediamine, 5(6)-amino-2-(p-aminophenyl) benzimidazole and terephthaloyl dichloride.

By "matrix resin" is meant an essentially homogeneous resin or polymeric material in which the yarn is embedded or coated. The polymeric resin may be thermoset or thermoplastic or a mixture of the two. Suitable thermoset resins include phenolic such as PVB phenolic, epoxy, polyester, vinyl ester and the like. Suitable thermoplastic resins include a blend of elastomeric block copolymers, polyvinyl butylral polyethylene copolymers, polyimides, polyurethanes, polyesters and the like. In some embodiments, the polyethylene copolymers comprise from 50 to 75 weight percent and the elastomeric block copolymers comprise from 25 to 50 weight percent of the resin. For example ethylene copolymers with acid monomers can be used, or alternatively any polyester of polyamide may be used. Ethylene acrylic acid copolymer is one suitable material. One skilled in the art will be able with minimal experimentation to specify a suitable polymer.

Figure 3A:
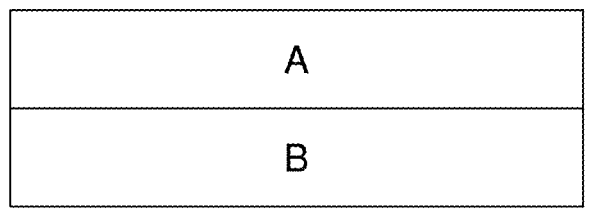
FIGS. 3A-3C show examples of laminates comprising a plurality of cross-plied tapes and a plurality continuous filament fabrics.
Figure 3B:
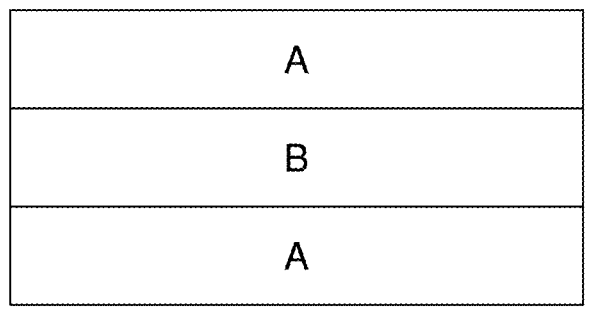
Figure 3C:
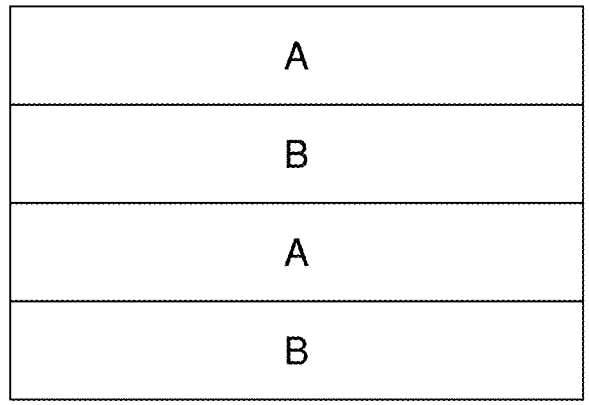

The relative amounts of cross-pied tapes or combinations of cross plied tapes and continuous filament fabrics in the laminate will depend on the specific design requirements of the final article. Likewise, the location of cross-pied tapes or combinations of cross plied tapes and continuous filament fabrics in the laminate will vary depending on specific designs. For example, FIG. 3A shows a plurality of cross-plied tapes "A" and a plurality of continuous filament fabrics "B". FIG. 3B shows a plurality of continuous filament fabrics "B" located between a plurality of cross-plied tapes "A". FIG. 3B shows alternating stacks of a plurality of cross-plied tapes "A" and a plurality of continuous filament fabrics "B". Other combinations are also possible.

A method of making an impact penetration resistant laminate comprises the steps of (i) providing a plurality of cross-plied non-fibrous ultra-high molecular weight polyethylene tapes 10 wherein the tape preferably comprises two monolayers of polyethylene oriented film 11 and 12 separated by an adhesive 13 arranged such that the orientation of one monolayer 11 is offset with respect to the orientation of the other monolayer 12, wherein the adhesive has a basis weight of no greater than 5 gsm, (ii) assembling a stack 20 comprising a plurality of UHMWPE tapes 10 of step (i) in an arrangement wherein at least 90 percent of the tapes are positioned such that the orientation of a monolayer of one tape is offset with respect to the orientation of the closest monolayer of the next monolayer and the combined weight of cross-plied tapes and adhesive in the stack is from 0.06 to 60 kg/m$^2$, (iii) subjecting the stack of step (ii) to a pressure of from 10 to 400 bar and a temperature of from 70 to 152 degrees C. for between 5 and 60 minutes, and (iv) cooling the laminate to a temperature of 25 degrees C. or less while retaining pressure.

Molding temperatures above about 132 degrees should be combined with pressures above about 135 Bar to inhibit degradation of the film.

Optionally, the assembly may be evacuated before applying pressure.

Preferably, the stack is assembled in such a manner that the stack comprises alternating layers of monolayer 11 or 12 and adhesive 13.

In some embodiments, the combined weight of polyethylene sheets and adhesive in the stack of step (ii) is from 1 to 40 kg/m$^2$.

Test Methods

Film Tensile Properties

Monolayer tensile properties were determined per ASTM D7744. When the monolayer was impractical to test in tension at full width, specimens were prepared by removing strips from the monolayer. The strips were around 2-4 mm wide and were parallel to the machine direction. They were removed by tearing the edge of the monolayer and then advancing the tear through the monolayer, parallel to the orientation direction, by gently pulling a filleted steel strip of around 1-mm width through the monolayer. Loose fibrils were removed from the edges by passing the strip lightly between fingers. Specimens were tabbed with Scotch® Magic™ tape (3M, Saint Paul, Minn.). Modulus is taken as M1 as defined in ASTM D7744.

Film Dimensions and Mass

Unless otherwise noted, length dimensions of greater than 1-mm were measured by eye with a ruler, precise to 1 mm. Film thickness was measured with a caliper precise to 0.01 mm, contacting the film between flat surfaces and taking thickness as the highest indicated value at which the film could not be pulled freely by hand through the caliper. Mass of film strips for lineal mass and density measurements were measured on a scale precise to 0.001 g.

Film Lineal Density and Density

Film lineal density was calculated by creating strips using the method described above for tensile test specimens, measuring their length and mass as described above, and calculating lineal density. Film density was calculated by dividing lineal density by film thickness (measured as described above) and by film strip width. Film strip width was measured with a caliper precise to 0.01 mm, by placing the film strip wide cross sectional dimension parallel to the direction of travel in the movable caliper jaw, slowly reducing the width of the caliper, and taking width as the highest value at which the film does not freely pass between the caliper jaws.

Film Dynamic Mechanical Response (DMA)

DMA results were measured in tension parallel to the draw direction, using strips prepared as described above. We used a RSA-III (TA Instruments, New Castle, Del.). Films were slit parallel to the orientation, with a width of 1-3 mm perpendicular to the orientation direction. Samples were loaded in oscillatory tensile stress up to 0.1% strain at 22±2° C. and frequencies ranging from 0.1-1.0 Hz. The ratio of real to imaginary modulus, tan δ, was determined.

Monolayer Ballistic Testing (Test Method A)

Film targets were prepared for ballistic testing by laying the orientation direction of successive monolayers at essentially right angles to each other, forming a cruciform-shape target. Thin, two-sided adhesive tape was placed between contacting layers on each leg of the cruciform shape, to hold the target in registry and mitigate the tendency for the monolayer to move in the plane of the target under the impact load, while not changing the structure of the square, cross-plied center section. The cruciform targets were then clamped inside a stiff, square metal frame on the front and back. The frame held the four legs of the cruciform shape between intermeshing grooves, while leaving the center, cross-plied section unsupported. The two pieces of frame were then clamped tight with toggle cam locks to provide consistent boundary conditions. The samples were then impacted in the unsupported center with right circular cylinders of oil rod steel approximately 5.5 mm in diameter and 1.04 grams mass, propelled flat end forward by a pneumatic gun. Impact velocity was varied by varying gas pressure in a reservoir used to propel the projectiles. The projectiles passed through an inductive intervalometer which measured projectile velocity just prior to impact. Impacts damaged the films in strips approximately the projectile caliber in width and to each boundary, extending in the orientation direction of each film layer impacted. To avoid the effect of accumulating target damage on ballistic impact results, each shot impact location was selected to avoid the cruciform-shaped, caliber-wide damaged areas created by previous shots. If the target was too damaged to place needed, additional shots outside previously damaged areas, one or more additional targets, prepared from the same parent film roll as described above was tested, and the results of the targets evaluated collectively to represent the performance of the film.

Two types of ballistic impact tests were performed. To estimate the velocity at which the projectile could barely perforate the target (or $V_{50}$), the gas pressure on the next shot was increased if the projectile was arrested, and decreased if the project perforated the target. Using this bisection logic, the $V_{50}$ was bracketed, and taken to be the average of the arresting and perforating impact velocities closest to this transition. From this, the specific energy absorbed was calculated as:

$$SEA = \frac{m_p}{2} V_{50}^2 \qquad \text{Equation 1}$$

where $m_p$ is the projectile mass and is the velocity to barely perforate the target.

Alternately, to evaluate smaller samples, overmatch testing was used. An even number of (typically eight) loose, unbonded layers of film were laid down at right angles to neighboring film layers, to form targets reinforced as $[0|90]_4$ in the center of the cruciform sample. The edges of the samples, outside the cruciform center, were coated with two-sided adhesive tape, and clamped inside a stiff rectangular metal frame with interpenetrating teeth. The center of the sample was then impacted with the right circular cylinder. The projectile velocity was measured by induction intervalometers before the impact and after the impact. The impact velocity was controlled to 366±9 m/s. Ballistic resistance was measured as the specific energy absorbed, SEA: the kinetic energy absorbed from the perforating projectile, normalized by the areal density of the cruciform center area, or:

$$SEA = \frac{m_p}{2}(V_s^2 - V_r^3) \qquad \text{Equation 2}$$

where $V_s$ is the impact velocity, and $V_r$ is the residual velocity after penetration. One skilled in the art will appreciate that, since overmatch testing reduces the kinetic energy that can be absorbed by the membrane catching of the rearmost plies, SEA determined by overmatch testing will tend to be smaller than SEA determined by $V_{50}$ testing, for the same material and when impacted at similar velocities. One skilled in the art will also appreciate that SEA in oriented polyethylene materials increases with impact velocity at high velocity. Because of this, it is necessary to adjust the impact velocity to between about twice and about four times the V50 of the target.

EXAMPLES

The following examples are given to illustrate the invention and should not be interpreted as limiting it in any way.

All parts and percentages are by weight unless otherwise indicated. Examples prepared according to the process or processes of the current invention are indicated by numerical values. Control or Comparative Examples are indicated by letters.

Examples 1-10: Monolayers

A continuous flow of UHMWPE polymer (HIZEX MILLION® 540RU from Mitsui & Co.—USA, Rye Brook, N.Y.) was fed through a vibrating hopper, to a heated, steel cylinder rotating perpendicular to gravity, at near the top of the cylinder, then passed under a doctor blade to ensure consistent powder thickness across a width, W. The cylinder was heated to temperature $T_1$, and traveled at roll surface speed $V_1$. The powder was contacted and sheared by an equal size, nominally equal temperature and equal speed, counterrotating steel cylinder, which was horizontally opposed, and loaded to a lineal pressure P. This caused the powder to coalesce and shear into a translucent film of thickness $t_{rolled}$, whose width was approximately equal to the width of the coating of polymer powder applied to the roll, stretched under transverse pressure to a ratio DR. The film was passed through a heated oven and then over 10 heated platens with non-stick surfaces, using driven rolls to increase the exit speeds of the film relative to the inlet speeds after the oven and after each platen. Initial speed at the first platen was defined as $V_2$ and final exit speed was defined as $V_n$. Platen temperatures were measured by thermocouples to be temperatures $T_2, \ldots, T_N$. Temperatures were adjusted to maintain a tension between 0.40 and 0.53 N/Tex. The total draw ratio, TDR, was defined as:

$$TDR = \frac{V_N}{V_2} \times DR \qquad \text{Equation 3}$$

Tables 1 and 2 describe the samples made, the monolayer physical properties and the ballistic testing results of cross-plied tapes made from the monlayers. Comparative Examples A to D were the monlayers used to make Tensylon® HSBD30A, a cross-plied tape available from E. I. DuPont de Nemours and Company, Wilmington, Del., herein after "DuPont". These monolayers are also as exemplified in U.S. Pat. No. 7,858,004. Comparative Example E was Tensylon® HM microtape prepared as per U.S. Pat. No. 8,206,810 hereinafter the "810" patent. For all inventive examples $V_2$=1.44 m/s. In either test ($V_{50}$ or overmatch), inventive examples had higher performance than the Comparative Examples. Surprisingly, this was accomplished at tenacities that would be considered unremarkable compared to the prior art—indeed, even lower than the Tensylon® HM microtape samples, which are made as described in the 810 patent. Equally surprisingly, this was accomplished at modulus values higher than those traditionally known and used, since the teachings of the prior art are that modulus is inversely related to ballistic protection. A further surprise compared to the prior art is that significant armor performance gains did not require a dramatically higher total draw ratio, TDR, than the prior art, which helps reduce cost and complexity of the manufacturing process. Yet a further surprise is that the improved articles were made by reducing temperature $T_1$ by as little as about c, while simultaneously increasing the pressure, P, and that this combination of surprisingly slightly lower $T_1$ and higher P appear to the only conditions in which ballistic protective value can be increased. This critical temperature range appears to be a new observation. The ability to create a film with TDR>180 (Example 10) further distinguishes the current work from the "810" patent.

Measured film densities were in the range of 650±50 kg/m³. In contrast, densities measured for the comparative samples were in the range of 800±50 kg/m³.

TABLE 1

| Example | Calender Roll Face Speed (m/min) | Calender Lineal Pressure (kN/cm) | Rolling Draw Ratio | First Draw Oven Ratio | Total Draw Ratio | Linear Density/ Titre (Tex) | Titre per width at Full Draw (Tex/cm) |
|---|---|---|---|---|---|---|---|
| Example 1 | 1.80 | 5.3 | 8.106 | 4.05 | 162.1 | | |
| Example 2 | 1.80 | 5.3 | 8.106 | 4.05 | 162.1 | | |
| Example 3 | 1.80 | 5.3 | 8.106 | 4.05 | 162.1 | | |
| Example 4 | 1.80 | 5.3 | 8.106 | 4.05 | 162.1 | | |
| Example 5 | 1.80 | 5.3 | 8.106 | 4.05 | 141.6 | 5960 | 3.68 |
| Example 6 | 1.80 | 5.3 | 8.106 | 4.05 | 151.5 | 5458 | 3.44 |
| Example 7 | 1.80 | 5.3 | 8.106 | 4.05 | 162.1 | 5006 | 3.22 |
| Example 8 | 1.80 | 5.3 | 8.106 | 4.05 | 173.4 | 4645 | 3.05 |
| Example 9 | 1.80 | 5.3 | 8.106 | 4.05 | 173.4 | | |
| Example 10 | 1.80 | 5.3 | 8.106 | 4.05 | 173.4 | 4722 | 3.04 |
| Example 11 | 1.80 | 5.3 | 8.106 | 4.05 | 185.6 | 4247 | 2.82 |
| Example 12 | 1.80 | 5.3 | 8.106 | 4.05 | 151.5 | 5504 | 3.47 |
| Example 14 | 1.80 | 6.1 | 8.106 | 4.05 | 162.1 | | |
| Example 15 | 1.80 | 6.1 | 8.106 | 4.05 | 151.5 | | |
| Example 16 | 1.80 | 6.1 | 8.106 | 4.05 | 162.1 | | |
| Example 17 | 1.80 | 6.1 | 8.106 | 4.05 | 151.5 | | |
| Example 19 | 1.80 | 7.0 | 8.106 | 4.05 | 162.1 | 4941 | 3.04 |
| Example 20 | 1.80 | 7.0 | 8.106 | 4.05 | 173.4 | 4608 | 2.86 |
| Example 21 | 1.80 | 7.0 | 8.106 | 4.05 | 162.1 | 5038 | 3.11 |
| Example 22 | 1.80 | 7.0 | 8.106 | 4.05 | 173.4 | 4637 | 2.88 |
| Example 23 | 1.80 | 7.0 | 8.106 | 4.05 | 182.2 | 4371 | 2.75 |
| Example 25 | 1.44 | 5.3 | 8.106 | 4.5 | 162.1 | | |
| Example 26 | 1.44 | 5.3 | 8.106 | 4.5 | 173.4 | | |
| Example 27 | 1.44 | 5.3 | 8.106 | 4.5 | 162.1 | | |
| Example 28 | 1.44 | 5.3 | 8.106 | 4.5 | 173.4 | | |
| Example 29 | 1.44 | 6.1 | 8.106 | 3.6 | 162.1 | 4042 | 2.71 |
| Example 30 | 1.44 | 6.1 | 8.106 | 3.6 | 173.4 | 3671 | 2.48 |
| Example 31 | 1.44 | 6.1 | 8.106 | 3.6 | 162.1 | 3998 | 2.68 |
| Example 32 | 1.44 | 6.1 | 8.106 | 3.6 | 173.4 | 3816 | 2.56 |

TABLE 2

| Example | SEA (J-m²/kg) at 370-m/s nominal impact velocity | Tenacity (N/Tex) | Modulus M1 (N/Tex) | Density (g/cm³) | Tan δ f = 0.1-Hz | Tan δ f = 0.3-Hz | Tan δ f = 1.0-Hz |
|---|---|---|---|---|---|---|---|
| Comparative Example A (Tensylon ® HS Film) | 50.0 | 1.67-1.85 | 106-115 | 0.78-0.83 | 0.228 | 0.161 | 0.050 |
| Comparative Example B (Tensylon ® HS Film) | 51.0 | 1.67-1.85 | 106-115 | 0.78-0.83 | 0.227 | 0.152 | 0.050 |
| Comparative Example C (Tensylon ® HS Film) | 52.0 | 1.67-1.85 | 106-115 | 0.78-0.83 | 0.239 | 0.169 | 0.058 |
| Comparative Example D (Endumax ® XF23 | 55.0 | | | 0.78-0.83 | 0.133 | 0.076 | 0.039 |
| Comparative Example E (Tensylon ® HM Film) | 52.4 | 2.2-2.5 | 119-128 | 0.75-0.80 | | | |
| Example 1 | 69.6 | | | | | | |
| Example 2 | 65.9 | | | | | | |
| Example 3 | 66.0 | | | | | | |
| Example 4 | 69.0 | | | | | | |
| Example 5 | 67.5 | 1.90 | 128 | 0.72 | | | |
| Example 6 | 68.0 | 1.71 | 117 | 0.73 | | | |
| Example 7 | 71.5 | 1.98 | 126 | 0.74 | | | |
| Example 8 | 74.6 | 2.06 | 130 | 0.69 | | | |
| Example 9 | 64.4 | | | | 0.066 | 0.037 | 0.023 |
| Example 10 | 75.7 | 1.98 | 134 | 0.69 | 0.069 | 0.037 | 0.024 |
| Example 11 | 66.2 | 1.83 | 129 | 0.68 | | | |
| Example 12 | 67.8 | 1.87 | 126 | 0.69 | | | |
| Example 14 | 77.0 | 1.94 | 134 | 0.70 | 0.081 | 0.050 | 0.028 |
| Example 15 | 66.1 | 1.93 | 130 | 0.67 | | | |
| Example 16 | 69.7 | 2.00 | 126 | 0.67 | | | |
| Example 17 | 65.9 | 2.03 | 134 | 0.65 | | | |
| Example 19 | 69.4 | 1.87 | 123 | | | | |
| Example 20 | 67.8 | 1.97 | 131 | | | | |
| Example 21 | 73.3 | 1.91 | 127 | | | | |

TABLE 2-continued

| Example | SEA (J-m²/kg) at 370-m/s nominal impact velocity | Tenacity (N/Tex) | Modulus M1 (N/Tex) | Density (g/cm³) | Tan δ f = 0.1-Hz | Tan δ f = 0.3-Hz | Tan δ f = 1.0-Hz |
|---|---|---|---|---|---|---|---|
| Example 22 | 65.4 | 2.03 | 132 | | | | |
| Example 23 | 80.0 | 2.35 | 146 | | | | |
| Example 25 | 72.4 | 2.03 | 128 | 0.67 | 0.082 | 0.042 | 0.024 |
| Example 26 | 69.3 | 2.06 | 136 | 0.66 | | | |
| Example 27 | 67.8 | 2.03 | 128 | 0.67 | | | |
| Example 28 | 59.1 | 2.23 | 144 | 0.67 | 0.086 | 0.047 | 0.025 |
| Example 29 | 70.2 | 1.98 | 134 | | | | |
| Example 30 | 75.6 | 2.05 | 139 | | | | |
| Example 31 | 69.7 | 1.98 | 132 | | | | |
| Example 32 | 70.4 | 2.03 | 132 | | | | |

Examples 11-12: Ballistic Article Manufacturing

The monolayers that were used to make Examples 4 and were further evaluated as ballistic articles, of dimensions relevant to body armor. Four films were placed side-by-side with about 1-mm nominal overlaps, and joined in the solid state into a continuous film of about 76-cm wide using the technique taught in U.S. Pat. No. 7,923,094, hereinafter "094". The monolayer became substantially translucent, and would no longer fibrillate readily when abraded by hand. Squares 22.9-cm×22.9-cm were then cut out of the resulting monolayer and laid up so that the direction of maximum orientation of each layer was essentially orthogonal compared to neighboring layers. Multiple targets of 32 monolayers were laid up this way. The targets were then clamped around the periphery with a stiff metal frame with interpenetrating teeth to hold the target fixed. The targets were then tested for $V_{50}$ as previously described. Table 3 compares the invention to a control of DuPont™ Tensylon® HS-grade film, which is representative of the prior art of oriented UHMWPE film technology. Film made per this invention offers an increase in armor performance when made into wider film following the teaching of "094".

TABLE 3

$V_{50}$ test results of invented oriented UHMWPE film impacted with 16-grain (1.04-g) steel right circular cylinders, compared to the prior art (Tensylon® HS film).

| Sample | Areal Density (kg/m²) | $V_{50}$ (m/s) | Specific Energy Absorbed (J-m²/kg) | Improvement over Comp B |
|---|---|---|---|---|
| Example 11 | 1.030 | 404.1 | 82.2 | 31% |
| Example 12 | 1.055 | 417.0 | 85.4 | 36% |
| Example 13 | 1.050 | 430.6 | 91.5 | 46% |
| Comparative Example B | 1.477 | 422.5 | 62.7 | |

Examples 14-17 and 19: Fragment Protective Rigid Composites

The monolayers from which Examples 11-13 were taken was converted into both rigid and flexible targets at areal densities representative of body armor and evaluated for $V_{50}$.

The monolayers were coated with a solution of 80% by solids weight Kraton® D1161 styrene-isoprene-styrene block copolymer from Kraton Polymers, LLC, Houston, Tex., and 20% solids by weight Enova® MT1100 aerogel silica from Cabot Corporation, Bilerica, Mass., dissolved in toluene at a ratio of approximately 7:1 solvent to solids. The coating was applied via gravure technology, with the gravure pattern selected to yield a coating basis weight of around 1.5 gsm. Half by weight of the coated monolayers were cut into squares, and then laid on top of the other half at right angles and passed through a laminator using sufficient temperature and pressure so that the adhesive flowed and bonded the two monolayers together to form cross-plied sheets. The UHMWPE was not degraded by the temperature exposure. The resulting, cross-plied sheets had a nominal basis weight of 68 gsm.

Part of the laminate was prepared with the cross-plied tapes comprising alternating layers of monolayer and adhesive cut into rectangles and stacked to form a preform with reinforcement described in common notation as $[0|90]_n$, where n was the number of layers of cross-plied sheets. The resulting preforms were then molded by placing them between press pads of ¹⁄₁₆ in (1.6 mm) nominal silicone rubber of 50 Shore A durometer hardness, evacuating the preform, then applying around 204 Bar pressure and 125° C. nominal platen temperature for about 30 minutes, then cooling the preforms to near room temperature while maintaining pressure, then releasing pressure. Such processing conditions for molding polyolefin film-reinforced armor composite panels are exemplified in Joseph J. Prifti, et al., "Hardened Tuned-Wall Plastic Radomes for Military Radars". US Army Materials and Mechanics Research Center Report, Accession Number ADA026146, Watertown, Mass. 1976. Laminates were then cut with a water jet to 35.6 cm×35.6 cm squares.

Figure 4:
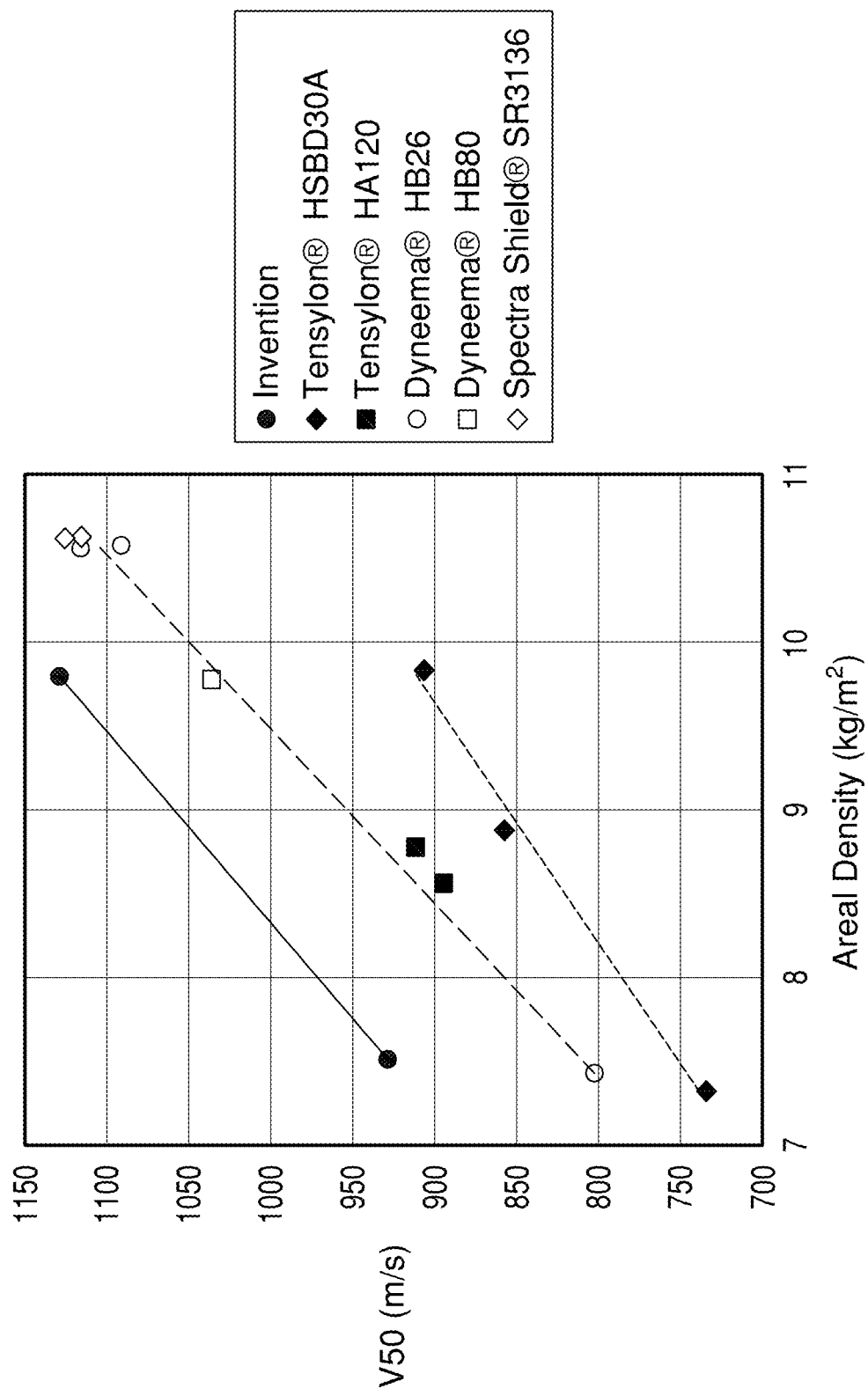
FIG. 4 shows plots V50 versus Areal Density against the 16-grain (1.04-g) right circular cylinder, for the current invention, prior art materials reinforced with oriented UHMWPE films (Tensylon®), and functionally competitive materials (Dyneema® and Spectra Shield®).

Laminated panels were restrained around the periphery by a stiff metal frame, and tested for $V_{50}$ as described in MIL-DTL-662F. Projectiles shot were 4, 16 and 64 grain right circular cylinders (RCCs) of steel with approximate hardness 29 on the Rockwell C scale and near unity aspect ratio (equivalently, 0.26 g, 1.04 g and 4.14 g), and .22 caliber (5.56 mm), type 1, non-saboted, chisel-nose steel cylinder fragment simulating projectiles (FSPs) per MIL-DTL-46593B. Table 4 presents the results. To demonstrate the advance of this invention compared to other of oriented UHMWPE monolayer reinforced composites, and its utility against other, fiber-reinforced materials, FIG. 4 plots V50 against the 16-grain RCC compared to film-reinforced Tensylon® materials from DuPont, as well as fiber-reinforced composites that represent possible alternative armor materials (Dyneema® from DSM Dyneema LLC, Greenville, N.C., and Spectra Shield® from Honeywell International, Morristown, N.J.). As seen, the inventive examples offer a clear improvement over the other listed materials.

TABLE 4

| Sample | Number of Cross Plies | Areal Density (psf) | Areal Density (kg/m2) | Threat | V50 (m/s) |
|---|---|---|---|---|---|
| Example 14 | 110 | 1.54 | 7.52 | 16-gr RCC | 929 |
| Example 15 | 110 | 1.52 | 7.40 | 4-gr RCC | 1254 |
| Example 16 | 110 | 1.52 | 7.44 | 64-gr RCC | 683 |
| Example 17 | 110 | 1.54 | 7.52 | 17-gr FSP | 864 |
| Example 18 | 145 | 2.00 | 9.79 | 16-gr RCC | 1129 |
| Example 19 | 145 | 2.00 | 9.77 | 64-gr RCC | 836 |

Examples 20-21: Rifle Bullet Protective Rigid Composites

Two panels made in the same way as examples 14-19 above, each having an areal density of 9.82 kg/m² and each having 145-cross plied tapes, were placed against blocks of Roma Plastilina No. 1 modeling clay conditioned to conform with National Institute of Justice standard NIJ 0101.06, and shot with "Wolf Classic" 7.62×39 mm, 8.0 g, lead core full metal jacket rifle bullets. The first panel (Example 20) was shot five times at impact velocities of between 700 and 740 m/s, and was not perforated. This demonstrates the design may be effective at stopping this bullet when fired at close range from a typical assault rifle. The second panel, Example 21, was shot for V69. Table 5 compares the inventive results to those of other known materials. In contrast to our invention, the comparison materials were tested by mounting them in a stiff metal frame around the periphery, instead of in front of a block of clay. This difference in the boundary conditions will lead to higher results in the comparison materials compared to the test on the invention. Despite this difference in test conditions, the advance of the invention over prior art materials reinforced with oriented UHMWPE films (Tensylon® grade HS films from Du Pont) is evident, as is its value against other commercial materials such as those from DSM Dyneema LLC.

TABLE 5

| Material | Areal Density (kg/m2) | V50 (m/s) | Test Conditions | Specific Energy Absorbed at V50 (J-m2/kg) |
|---|---|---|---|---|
| Example 21 | 9.82 | 788 | clay | 253 |
| DuPont ™ Tensylon ® HA120 | 9.76 | 687 | frame | 193 |
| DuPont ™ Tensylon ® HSBD30A | 10.46 | <579. | frame | <128 |
| DSM Dyneema ® HB26 | 9.77 | 735 | frame | 221 |
| DSM Dyneema ® HB80 | 9.77 | 786 | frame | 253 |

Examples 22-23: Flexible Armor Composites

A second part of the adhesive-coated monolayer used in Examples 14-21 were cross-plied so that the adhesive of the cross plied sheets was sandwiched between the two monolayers. The total adhesive content between the monolayers was nominally 3 gsm. There was no adhesive bonding neighboring cross plied sheets together, and the layers could slide relative to each other easily when stacked. These preforms were molded at 34 Bar pressure. After removing from the press, the individual cross plied sheets did not adhere to neighboring cross plied sheets, and were peeled apart. The resulting construction through the thickness was [0-direction oriented UHMWPE/adhesive/90-direction UHMWPE], where the adhesive was the same formulation used for examples 14-21. The laminates had low bending rigidity, were facile to handle and cut, had no residual curl and appeared under casual effort to be resistant to abrasion when rubbed against other layers under modest pressure. The samples were cut into 35.6 cm×38 cm rectangles and laid up in stacks so that the orientation direction of each monolayers was nominally at right angles to the next monolayer. This demonstrates that the invention can be readily converted by means known in the art into soft armor structures that could be used to protect flexible structures such as the human torso.

Examples 25-27: Flexible Armor Composites

The same roll of monolayer material as used in Examples 11-24 was partially sheeted into roughly square shapes, then consolidated into a continuous roll of cross plied tape material in a double belt laminator, using as the adhesive between the cross plies a previously extruded film of DuPont™ Surlyn® 1707, of 2.8 gsm basis weight. The material was laminated between continuous fluoropolymer-coated fiberglass belts, heated to about 120° C. for about 20-seconds and nipped together under low pressure, then held together while being cooled to below about 40° C., so that the materials were heated and then compressed, the adhesive film flowed and bonded the cross plied tapes together without damaging the oriented UHMWPE monolayers, and the materials were cooled under low pressure to make a continuous roll of cross-plied tape with the construction [0-direction oriented UHMWPE/Surlyn® adhesive/90-direction oriented UHMWPE]. The basis weight of the resulting crossply was measured as being 62 gsm. As before, the material was facile to handle and cut and appeared resistant to abrasion against itself. This demonstrates that the invention can be readily converted by means known in the art as economical into a product form of immediate utility to a body armor manufacturer, and then used to protect flexible structures such as the human torso. As above, samples were then cut from the continuous roll into 35.6 cm×38 cm rectangles and laid up in stacks so that the orientation direction of the films were at nominally right angles to neighboring films.

Examples 22-27 were made by stacking multiple cross-plied tapes with the machine directions (relative to the laminate rolls) parallel. The stacks were then placed in thin low density polyethylene bags which had negligible resistance to ballistic penetration. They were tested for $V_{50}$ against a range of projectiles, either clamped around the periphery in a two-part, stiff metal frame with interpenetrating teeth, or loosely held against Roma Plastilina No. 1 modeling clay which had been conditioned to conform to the requirements laid out in National Institute of Justice standard 0101.06, "Ballistic Resistance of Body Armor", as noted in the table. For the 0.44 magnum bullets, the back face deflections first two shots impacted at around 430 m/s, and the depth of the crater left in the clay were measured for each. Impact velocity was increased thereafter to determine $V_{50}$. Table 6 describes the test conditions and ballistic test results. That the targets withstood the large number of impacts noted in Table 6 shows the material is capable of the multiple impact resilience needed in body armor. The back face deflections were below 44-mm, which is considered suitable for use in torso armor per NIJ 0101.06.

as DuPont™ Kevlar® AS450X was similarly tested. DuPont™ Kevlar® AS450X is woven para-aramid fabric impregnated with a penetrating ethylene copolymer film. Velocity just prior to impact was measured. Results are

TABLE 6

| Example 27 | Sample | Example 22 | Example 23 | Example 24 | Example 25 | Example 26 |
|---|---|---|---|---|---|---|
| 78 | Number of Layers | 62 | 62 | 73 | 66 | 66 |
| 4.89 | Areal Density (kg/m²) | 4.15 | 4.15 | 4.89 | 4.15 | 4.15 |
| 0.44-magnum SJHP | Threat | MIL-DTL-46593B fragment simulating projectile, 0.22-caliber, type 1, non-saboted | Remington 9-mm FMJ | 0.44-magnum SJHP | MIL-DTL-46593B fragment simulating projectile, 0.22-caliber, type 1, non-saboted | Remington 9-mm FMJ |
| clay | Test Conditions | Frame | Clay | clay | frame | clay |
| 2 back face + 6 for V50 | Number of Shots | 16 | 16 | 2 back face + 6 for V50 | 16 | 16 |
| 538 | V50 (m/s) | 576 | 524 | 489 | 642 | 532 |
| 38, 39 | Back Face Deflection (mm) | | | 39, 40 | | |

Figure 5:
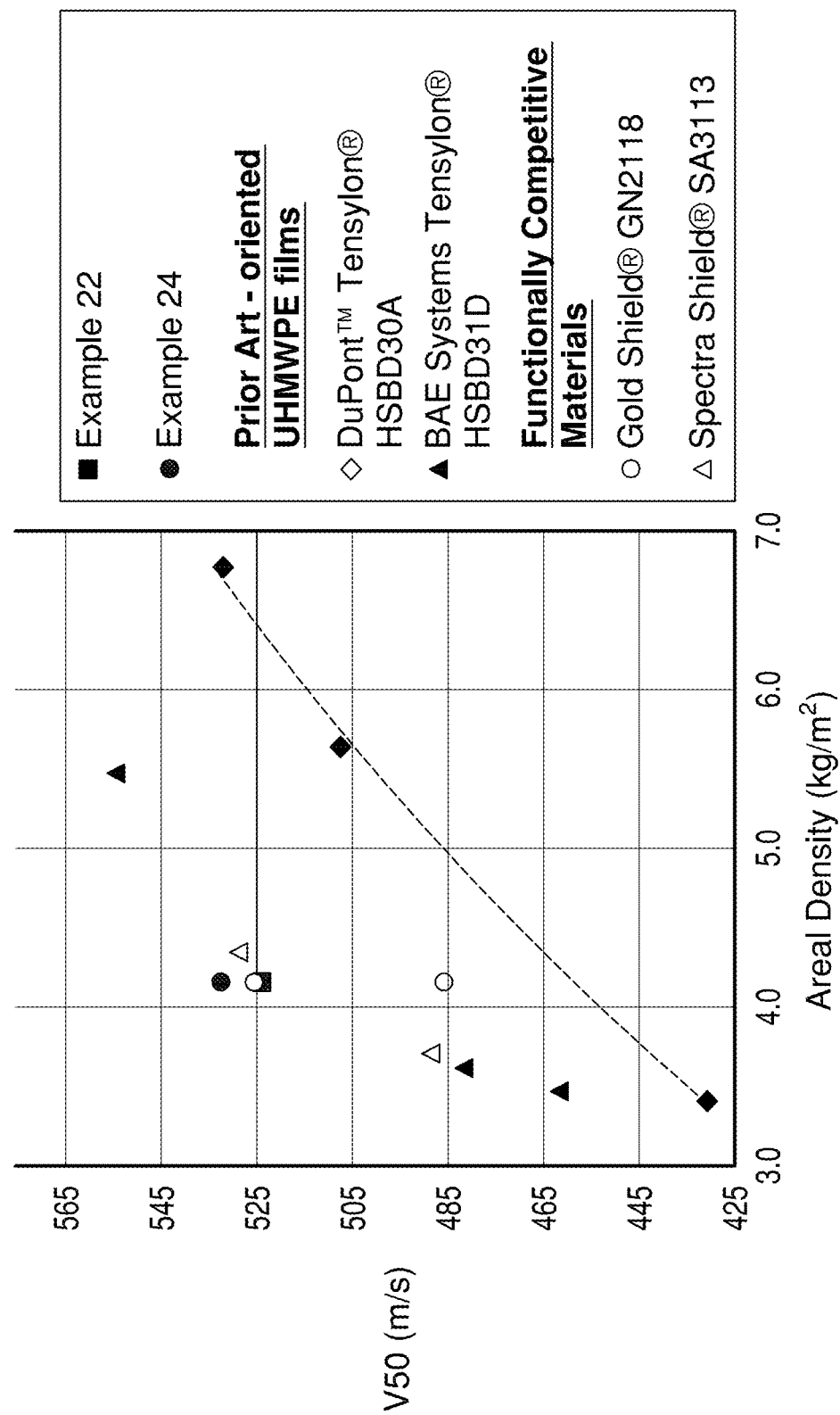
FIG. 5 shows plots V50 against 9×19-mm full metal jacket parabellum pistol bullets as a function of target areal density.
Figure 6:
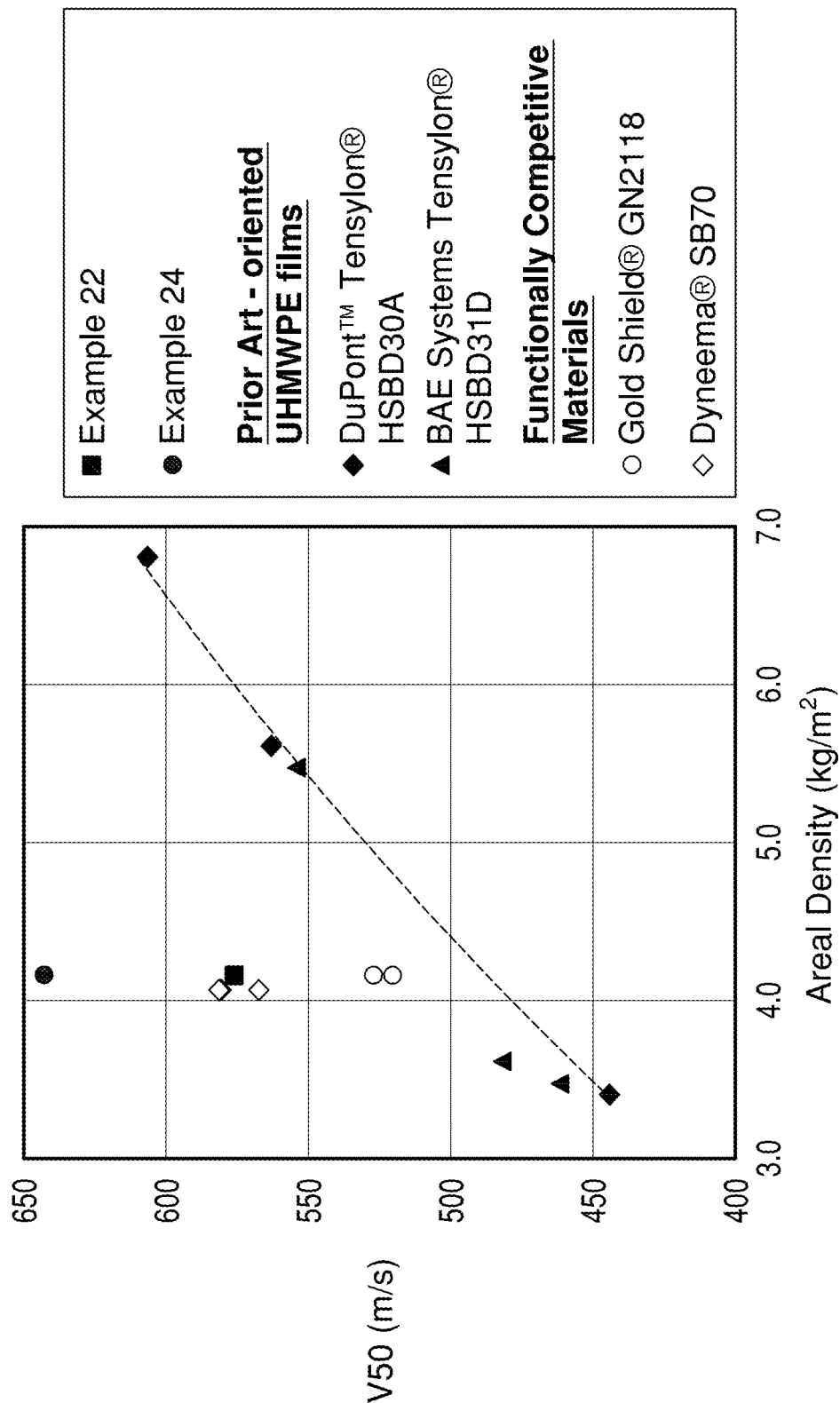
FIG. 6 shows plots V50 versus areal density for flexible armor targets of the invention, prior art oriented UHMWPE film-reinforced materials, and functionally competitive materials, impacted with MIL-DTL-46593B 0.22-caliber fragment simulating projectiles, type 1, non-saboted.

FIG. 5 compares pistol bullet data and FIG. 6 compares fragment simulating projectile data and also compares data from Table 6 with samples tested in the same laboratory and same testing conditions from the prior art related to oriented UHMWPE film-reinforced composites (Tensylon® HSBD30A from DuPont and Tensylon® HSBD31D, formerly offered by BAE Systems, Arlington, Va.), and functionally competitive materials of reinforcement fibers (Gold Shield® and Spectra Shield® from Honeywell, and Dyneema® from DSM Dyneema LLC. The invention clearly offers an improvement over the prior art in allowing more protection per weight, or alternately, a large weight savings at equal protection. The invention further allows protection that, in terms of $V_{50}$, is competitive with or superior to functionally competitive materials.

Table 6 shows that the invention allows low back face deflection, which is considered an indicator of potential injury to the wearer and thus is preferably low.

Example 28: Stab Protective Flexible Composite

The shot target of Example 27 in Table 6 was subsequently tested for its ability to resist penetration by knives. Areas around the periphery that were less disturbed by the damage of arresting pistol bullets were impacted with the "P1" blade specified by National Institute of Justice standard NIJ-0115.00. The sample was placed on a series of rubber- and foam pads, as specified in NIJ-0115.00, then impacted with the blade falling in a missile of 1.8758 kg mass, again consistent with NIJ-0115.00, guided in vertical free fall from 1.500 m. The length of the cut in a witness paper under the target as specified was measured with a magnifying glass and caliper, and used to infer the depth of blade penetration of the triangular blade through the target and witness paper and into the foam backing. For comparison, a sample of a stab-resistant body armor laminate of the prior art, marketed given in Table 7. As seen, the invention offered stab protection superior to an example of the prior art, even after substantial damage from prior ballistic testing, at a lower areal density, in addition to desirable bullet protection.

TABLE 7

| Sample | Number of layers | Areal Density (kg/m²) | Impact Energy (J) | Blade penetration depth (mm) |
|---|---|---|---|---|
| Example 28 (shot sample from Example 27) | 78 | 4.89 | 24.4, 24.4 | 14.8, 15.3 |
| Comp. Ex. - Kevlar ® AS450X | 20 | 5.55 | 25.0 | 16.3 |

Example 29: Resistance to Low Speed Puncture

The preceding examples demonstrated that our findings counter teachings of the prior art that, for self-similar armor materials of oriented polymers, ballistic impact penetration increases as a fractional power of increasing tenacity, and decreases as a smaller fractional power of increasing modulus.

To attempt to understand this surprise, and infer if the surprising results reflect an improved sensitivity to the high strain rate of typical ballistic impact, samples were punctured at slow speed in a load frame, and the resulting maximum force required to puncture was measured.

Material from the laminates made for Examples 25-28 was cut into squares approximately 10 cm on a side, centered on a steel anvil with a hole in its center approximately 1 cm diameter, and perforated by a steel indenter with a hemispherical tip of 1 mm radius, driven at a constant rate of 5.08 cm/min. A load cell attached to the indenter was used to measure the maximum force required to puncture the film. For comparison, we also evaluated:

(i) two commercially available materials, (Tensylon® HSBD30A and Tensylon® HA120 both from DuPont, that are typical of laminates for armor materials biaxially reinforced with oriented UHMWPE films. Both were tested as-made. A sample of Tensylon® HA120 was also further consolidated in a hot press between silicone rubber press pads at 120° C. and 204 Bar pressure for 20 minutes, then cooled under pressure back to room temperature.

(ii) a laminated high strength fabric, Kevlar® AS450X from DuPont, a woven fabric of para-aramid filament yarn partially impregnated with an ionomer binder, which is designed for body armor and which resists penetration by punctures from handheld weapons.

(iii) two plastic films commonly used for puncture-resistant packaging, namely polyester terephthalate (PET) plastic film (Mylar® from DuPont Teijin Films, Hopewell, Va.) and polycarbonate sheet.

Table 8 compares the results. Example 28 appears to offer a significant increase in resistance to perforation over the Comparative Example even at low strain rates even when the Comparative Example has been highly consolidated. These results show the invention is useful for puncture- or tear-resistant packaging or body armor, in addition to protecting from high speed impacts.

TABLE 8

| Material | Basis weight (gsm) | Force to perforate, normalized by basis weight (N-m²/kg) |
|---|---|---|
| Example 29 | 67 | 784 |
| Comp. Ex. - Tensylon ® HSBD30A | 109 | 309 |
| Comp. Ex. - Tensylon ® HA120 | 203 | 351 |
| Comp. Ex. - Tensylon ® HA120 (consolidated in hot press) | 203 | 561 |
| Comp. Ex. - Kevlar ® AS450X | 270 | 543 |
| Comp. Ex. - Mylar ® PET film | 78 | 299 |
| Comp. Ex. - Polycarbonate sheet | 303 | 190 |

What is claimed is:

1. A non-fibrous oriented polyethylene monolayer comprising ultra high molecular weight polyethylene (UHMWPE), the polyethylene having a viscosity-average molecular weight of 2,000,000 or greater, wherein
    (iv) the monolayer has a width of 10.0 mm or greater and a modulus of at least 100 N/tex,
    (v) the monolayer has a tan δ when measured in dynamic mechanical analysis (DMA) of tensile response in a frequency sweep between 0.1 Hz≤f≤1.0 Hz meeting the inequality of tan δ<1/(f×a)+b−(f×c) where a=120, b=0.045 and c=0.016, and
    (vi) the monolayer has a maximum areal weight of no greater than 45 gsm.

2. The monolayer of claim 1, wherein the monolayer has a thickness of between 0.02 and 0.06 mm.

3. The monolayer of claim 1, wherein the monolayer has a density of between 600 and 750 kg/m³ or 600 and 720 kg/m³ or 600 and 700 kg/m³ or 600 and 680 kg/m³.

4. A cross-plied tape comprising a plurality of monolayers of claim 1 wherein each monolayer is arranged such that the direction of maximum orientation in one monolayer is orthogonal with respect to the direction of maximum orientation in the next monolayer.

5. The tape of claim 4 further comprising a thermoplastic adhesive having a maximum areal weight of 5 gsm coated onto the surface of at least one monolayer.

6. The tape of claim 4 comprising two or four monolayers.

7. The tape of claim 5, wherein the adhesive further comprises a textile layer.

8. The tape of claim 7, wherein the textile is a scrim or nonwoven fabric.

9. A consolidated impact and penetration-resistant laminate comprising a plurality of cross-plied tapes of claim 4 wherein the laminate, when tested according to Test Method A, has a specific energy absorption (SEA) of at least 63 J-m²/kg or at least 67 J-m²/kg or at least 69 J-m²/kg or at least 71 J-m²/kg.

10. The laminate of claim 9 further comprising at least one layer of continuous filament fibers embedded in a matrix resin.

11. The laminate of claim 10 wherein the continuous filament fibers are p-aramid or UHMWPE or a combination of both.

12. The monolayer of claim 1, wherein the monolayer, when tested according to Test Method A, has a specific energy absorption (SEA) of at least 67 J-m²/kg.

13. The monolayer of claim 1, wherein the monolayer, when tested according to Test Method A, has a specific energy absorption (SEA) of at least 71 J-m²/kg.

14. The monolayer of claim 1, wherein the monolayer has a width to thickness ratio of at least 400:1.

15. A non-fibrous oriented polyethylene monolayer comprising ultra high molecular weight polyethylene (UHMWPE), the polyethylene having a viscosity-average molecular weight of 2,000,000 or greater, wherein
    (i) the monolayer has a width of 10.0 mm or greater and a modulus of at least 100 N/tex,
    (ii) the monolayer has a tan δ when measured in dynamic mechanical analysis (DMA) of tensile response in a frequency sweep between 0.1 Hz≤f≤1.0 Hz meeting the inequality of tan δ<1/(f×a)+b−(f×c) where a=150, b=0.043 and c=0.016, and
    (iii) the monolayer has a maximum areal weight of no greater than 45 gsm.

16. A cross-plied tape comprising a plurality of monolayers of claim 15, wherein each monolayer is arranged such that the direction of maximum orientation in one monolayer is orthogonal with respect to the direction of maximum orientation in the next monolayer.

17. A consolidated impact and penetration-resistant laminate comprising a plurality of cross-plied tapes of claim 16 wherein the laminate, when tested according to Test Method A, has a specific energy absorption (SEA) of at least 63 J-m²/kg.

18. A non-fibrous oriented polyethylene monolayer comprising ultra high molecular weight polyethylene (UHMWPE), the polyethylene having a viscosity-average molecular weight of 2,000,000 or greater, wherein
    (i) the monolayer has a width of 10.0 mm or greater and a modulus of at least 100 N/tex,
    (ii) the monolayer has a tan δ when measured in dynamic mechanical analysis (DMA) of tensile response in a frequency sweep between 0.1 Hz≤f≤1.0 Hz meeting the inequality of tan δ<1/(f×a)+b−(f×c) where a=170, b=0.042 and c=0.016, and
    (iii) the monolayer has a maximum areal weight of no greater than 45 gsm.

19. A cross-plied tape comprising a plurality of monolayers of claim 18, wherein each monolayer is arranged such that the direction of maximum orientation in one monolayer is orthogonal with respect to the direction of maximum orientation in the next monolayer.

20. A consolidated impact and penetration-resistant laminate comprising a plurality of cross-plied tapes of claim 19 wherein the laminate, when tested according to Test Method A, has a specific energy absorption (SEA) of at least 63 $J\text{-}m^2/kg$.

* * * * *